United States Patent
Granucci et al.

(10) Patent No.: US 8,215,560 B2
(45) Date of Patent: *Jul. 10, 2012

(54) REAL-TIME CARD BALANCE ON CARD PLASTIC

(75) Inventors: Nicole Janine Granucci, San Francisco, CA (US); Carrie Elaine Vriheas, San Francisco, CA (US); Ayman A. Hammad, Pleasanton, CA (US)

(73) Assignee: Visa U.S.A., Inc., San Francisco ( * ) Notice: Subject to any disclaimer, the term of this patent is extended or adjusted under 35 U.S.C. 154(b) by 797 days.

This patent is subject to a terminal disclaimer.

(21) Appl. No.: 11/904,335

(22) Filed: Sep. 26, 2007

(65) Prior Publication Data

US 2009/0078777 A1    Mar. 26, 2009

(51) Int. Cl.
*G06K 19/06* (2006.01)
*G06Q 40/00* (2006.01)

(52) U.S. Cl. .................. 235/492; 235/493; 705/41

(58) Field of Classification Search .............. 235/492, 235/487, 493, 379–381, 384, 382; 705/39, 705/41, 13, 40, 35

See application file for complete search history.

(56) References Cited

U.S. PATENT DOCUMENTS

| | | | | |
|---|---|---|---|---|
| 3,356,021 A * | 12/1967 | May et al. | | 101/93.34 |
| 4,044,231 A * | 8/1977 | Beck et al. | | 235/488 |
| 4,614,861 A * | 9/1986 | Pavlov et al. | | 235/380 |
| 4,639,584 A | 1/1987 | Adams et al. | | |
| 4,701,601 A | 10/1987 | Francini et al. | | |
| 4,814,591 A * | 3/1989 | Nara et al. | | 235/380 |
| 4,868,376 A * | 9/1989 | Lessin et al. | | 235/492 |
| 4,877,179 A * | 10/1989 | Baker et al. | | 232/7 |
| 5,034,597 A * | 7/1991 | Atsumi et al. | | 235/380 |
| 5,055,662 A * | 10/1991 | Hasegawa | | 235/492 |
| 5,359,183 A | 10/1994 | Skodlar | | |
| 5,521,363 A | 5/1996 | Tannenbaum | | |
| 5,590,038 A | 12/1996 | Pitroda | | |
| 5,591,949 A * | 1/1997 | Bernstein | | 235/380 |
| 5,678,939 A * | 10/1997 | Ross | | 401/6 |
| 5,777,903 A | 7/1998 | Piosenka et al. | | |
| 6,378,775 B2 * | 4/2002 | Hayashida | | 235/492 |
| 6,556,126 B1 * | 4/2003 | Imazuka et al. | | 340/5.7 |
| 6,631,849 B2 * | 10/2003 | Blossom | | 235/492 |
| 6,749,118 B2 * | 6/2004 | Kobayashi et al. | | 235/449 |

(Continued)

FOREIGN PATENT DOCUMENTS

EP    291259 A    11/1988

(Continued)

OTHER PUBLICATIONS

Lucy Lzarony, "Stuck for a gift? Give a prepaid credit card", www.bankrate.com, Dec. 21, 1998.*

(Continued)

*Primary Examiner* — Michael G Lee
*Assistant Examiner* — Suezu Ellis
(74) *Attorney, Agent, or Firm* — Kilpatrick Townsend & Stockton

(57) ABSTRACT

A system, method and prepaid payment card configured to display a current card balance on the prepaid payment card. The prepaid payment card receives a balance request from a button on the card. After retrieving the current card balance encoded on the prepaid payment card, the card displays the current card balance. Remote terminals may be configured to support the real-time display of a balance on a prepaid payment card by writing the current balance to the card after a payment transaction has occurred.

19 Claims, 8 Drawing Sheets

U.S. PATENT DOCUMENTS

| | | | |
|---|---|---|---|
| 6,926,200 B1 * | 8/2005 | Hayashida | 235/379 |
| 6,990,330 B2 | 1/2006 | Veerepalli et al. | |
| 7,159,770 B2 * | 1/2007 | Onozu | 235/383 |
| 7,213,755 B2 * | 5/2007 | Newsome et al. | 235/384 |
| 7,440,771 B2 * | 10/2008 | Purk | 455/556.1 |
| 7,653,599 B2 * | 1/2010 | Doran et al. | 705/41 |
| 7,784,687 B2 | 8/2010 | Mullen et al. | |
| 7,793,851 B2 | 9/2010 | Mullen | |
| 7,828,220 B2 | 11/2010 | Mullen | |
| 7,931,195 B2 | 4/2011 | Mullen | |
| 7,954,705 B2 | 6/2011 | Mullen | |
| 8,011,577 B2 | 9/2011 | Mullen | |
| 8,020,775 B2 | 9/2011 | Mullen | |
| 8,074,877 B2 | 12/2011 | Mullen | |
| 2001/0003445 A1 * | 6/2001 | Gauther et al. | 345/87 |
| 2001/0013542 A1 | 8/2001 | Horowitz et al. | |
| 2004/0064406 A1 | 4/2004 | Yates et al. | |
| 2005/0065884 A1 | 3/2005 | Capurso | |
| 2008/0029607 A1 | 2/2008 | Mullen | |
| 2008/0035738 A1 | 2/2008 | Mullen | |
| 2008/0054068 A1 | 3/2008 | Mullen | |
| 2008/0054079 A1 | 3/2008 | Mullen | |
| 2008/0054081 A1 | 3/2008 | Mullen | |
| 2008/0065555 A1 | 3/2008 | Mullen | |
| 2008/0099556 A1 | 5/2008 | Park | |
| 2008/0302869 A1 | 12/2008 | Mullen | |
| 2008/0302876 A1 | 12/2008 | Mullen | |
| 2009/0081990 A1 | 3/2009 | Granucci et al. | |
| 2009/0134218 A1 | 5/2009 | Yuzon et al. | |
| 2009/0159663 A1 | 6/2009 | Mullen | |
| 2009/0159667 A1 | 6/2009 | Mullen et al. | |
| 2009/0159668 A1 | 6/2009 | Mullen et al. | |
| 2009/0159669 A1 | 6/2009 | Mullen et al. | |
| 2009/0159670 A1 | 6/2009 | Mullen et al. | |
| 2009/0159671 A1 | 6/2009 | Mullen et al. | |
| 2009/0159672 A1 | 6/2009 | Mullen et al. | |
| 2009/0159673 A1 | 6/2009 | Mullen et al. | |
| 2009/0159680 A1 | 6/2009 | Mullen et al. | |
| 2009/0159681 A1 | 6/2009 | Mullen et al. | |
| 2009/0159682 A1 | 6/2009 | Mullen et al. | |
| 2009/0159688 A1 | 6/2009 | Mullen et al. | |
| 2009/0159689 A1 | 6/2009 | Mullen et al. | |
| 2009/0159690 A1 | 6/2009 | Mullen et al. | |
| 2009/0159696 A1 | 6/2009 | Mullen et al. | |
| 2009/0159697 A1 | 6/2009 | Mullen et al. | |
| 2009/0159698 A1 | 6/2009 | Mullen et al. | |
| 2009/0159699 A1 | 6/2009 | Mullen et al. | |
| 2009/0159700 A1 | 6/2009 | Mullen et al. | |
| 2009/0159701 A1 | 6/2009 | Mullen et al. | |
| 2009/0159702 A1 | 6/2009 | Mullen et al. | |
| 2009/0159703 A1 | 6/2009 | Mullen et al. | |
| 2009/0159704 A1 | 6/2009 | Mullen et al. | |
| 2009/0159705 A1 | 6/2009 | Mullen et al. | |
| 2009/0159706 A1 | 6/2009 | Mullen et al. | |
| 2009/0159707 A1 | 6/2009 | Mullen et al. | |
| 2009/0159708 A1 | 6/2009 | Mullen et al. | |
| 2009/0159709 A1 | 6/2009 | Mullen et al. | |
| 2009/0159710 A1 | 6/2009 | Mullen et al. | |
| 2009/0159711 A1 | 6/2009 | Mullen et al. | |
| 2009/0159712 A1 | 6/2009 | Mullen et al. | |
| 2009/0159713 A1 | 6/2009 | Mullen et al. | |
| 2009/0160617 A1 | 6/2009 | Mullen et al. | |
| 2009/0308921 A1 | 12/2009 | Mullen | |
| 2009/0314840 A1 * | 12/2009 | Granucci et al. | 235/492 |
| 2011/0272465 A1 | 11/2011 | Mullen et al. | |
| 2011/0272466 A1 | 11/2011 | Mullen et al. | |
| 2011/0272467 A1 | 11/2011 | Mullen et al. | |
| 2011/0272471 A1 | 11/2011 | Mullen et al. | |
| 2011/0272472 A1 | 11/2011 | Mullen et al. | |
| 2011/0272473 A1 | 11/2011 | Mullen et al. | |
| 2011/0272474 A1 | 11/2011 | Mullen et al. | |
| 2011/0272475 A1 | 11/2011 | Mullen et al. | |
| 2011/0272476 A1 | 11/2011 | Mullen et al. | |
| 2011/0272477 A1 | 11/2011 | Mullen et al. | |
| 2011/0272478 A1 | 11/2011 | Mullen et al. | |
| 2011/0272479 A1 | 11/2011 | Mullen et al. | |
| 2011/0272480 A1 | 11/2011 | Mullen et al. | |
| 2011/0272481 A1 | 11/2011 | Mullen et al. | |
| 2011/0272482 A1 | 11/2011 | Mullen et al. | |
| 2011/0272483 A1 | 11/2011 | Mullen et al. | |
| 2011/0272484 A1 | 11/2011 | Mullen et al. | |
| 2011/0276380 A1 | 11/2011 | Mullen et al. | |
| 2011/0276381 A1 | 11/2011 | Mullen et al. | |
| 2011/0276416 A1 | 11/2011 | Mullen et al. | |
| 2011/0276424 A1 | 11/2011 | Mullen et al. | |
| 2011/0276425 A1 | 11/2011 | Mullen et al. | |
| 2011/0276436 A1 | 11/2011 | Mullen et al. | |
| 2011/0276437 A1 | 11/2011 | Mullen et al. | |
| 2011/0278364 A1 | 11/2011 | Mullen et al. | |
| 2011/0282753 A1 | 11/2011 | Mullen et al. | |

FOREIGN PATENT DOCUMENTS

| | | | |
|---|---|---|---|
| EP | 884293 A | 5/1998 | |
| EP | 1017756 A1 | 7/2000 | |
| TR | 2008-03302 Y | 9/2008 | |

OTHER PUBLICATIONS

"SmarTrip More Than a Smart Card. It's Pure Genius", 1998-2004, WMATA, http://www.wmata.com/riding/smartrip.cfm.*

"Adding value to SmarTrip is as easy as using it", 1998-2004, WMATA, http://www.wmata.com/riding/smartrip_adding_value.cfm.*

* cited by examiner

REAL-TIME CARD BALANCE ON CARD PLASTIC

BACKGROUND

1. Field of the Invention

Aspects of the present invention relate in general to financial services. Aspects include a prepaid payment card apparatus, system, method and computer-readable medium to display a real-time prepaid payment card balance. Further aspects of the invention include a method of storing and displaying a real-time prepaid payment card balance.

2. Description of the Related Art

The traditional paper "gift-certificate" is gradually being replaced by prepaid payment cards—debit cards with a set limited value associated with a Primary Account Number (PAN). Some cards may be affiliated with a particular vendor, such as a department store, supermarket or restaurant; yet other cards may be affiliated with an acquirer, payment processor, or other issuer. Prepaid payment cards may be distributed with any dollar amount, and some prepaid cards may be replenished with additional funds.

When a consumer cardholder makes a purchase, the prepaid payment card may be used to pay for the transaction. If the purchase amount equals or exceeds the value of the prepaid payment card, the customer simply pays the excess amount using cash, credit card, or other financial instrument accepted by the vendor. However, when the purchase amount is less than the value of the prepaid payment card, the purchase price is simply subtracted from the prepaid payment card value, and a new balance remains associated with the card.

Cardholders who carry prepaid payment cards are often unaware of the balance of a prepaid payment card, especially on non-reloadable card products. While some issuer and acquirers mandate support for balance inquiries for some gift cards and incentive cards, such support is optional at merchants.

When issuers fail to support these enhancements, or when merchants do not support them, cardholders are restricted to spending the amount that is available on the card within one transaction often without knowing the balance in advance.

When issuers, acquirers, and processors do not support these enhancements at the point-of-sale, the consumer is inconvenienced, and the process breaks down. Consumer frustration is common, resulting in higher amounts of breakage (resulting in unrecognized sales volume), and alternate forms of payment being used. Worse, consumers are discouraged from purchasing more prepaid payment cards.

In the re-loadable prepaid card category, the only way a consumer can determine their card balance is by calling their card issuer/third party agent or looking up the information online.

SUMMARY

Embodiments of the invention include a system, method and prepaid payment card configured to display a current card balance on the prepaid payment card. A remarkable aspect of the invention is that a card balance retrieved from the card issuer and stored at the prepaid payment card, as generally no card balance information is ever stored on prepaid payment cards. The prepaid payment card receives a balance request from a button on the card. After retrieving the current card balance encoded on the prepaid payment card, the card displays the current card balance.

DETAILED DESCRIPTION

One aspect of the present invention includes the realization that displaying a real-time balance on a prepaid payment card reduces the cost of issuers supporting balance inquiry and balance returns from consumer cardholders. With the card balance display solution, re-loadable card holders would be able to check their balance at any time, generating a higher volume of unplanned purchases, and potentially a higher amount of re-loads at the point of sale.

Embodiments of the present invention include a card apparatus, system, method, and computer-readable medium configured to support the real-time display of a balance on a prepaid payment card. Other embodiments of the present invention may include remote terminals configured to support the real-time display of a balance on a prepaid payment card.

Figure 1A:
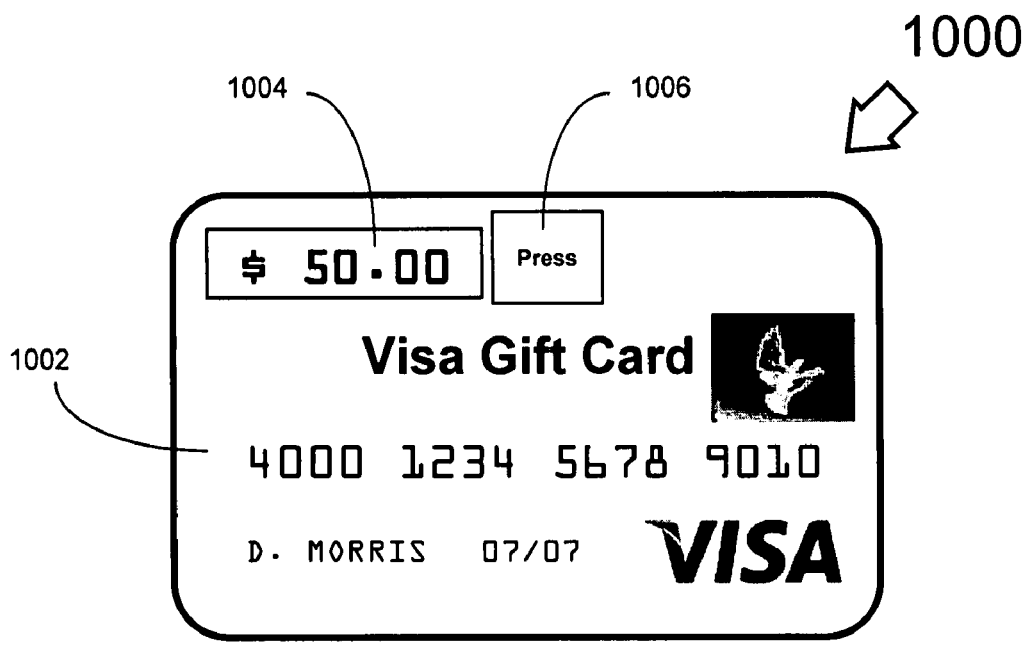
FIGS. 1A-B illustrate an embodiment of a non-reloadable prepaid payment card configured to display the current balance of the card.
Figure 1B:
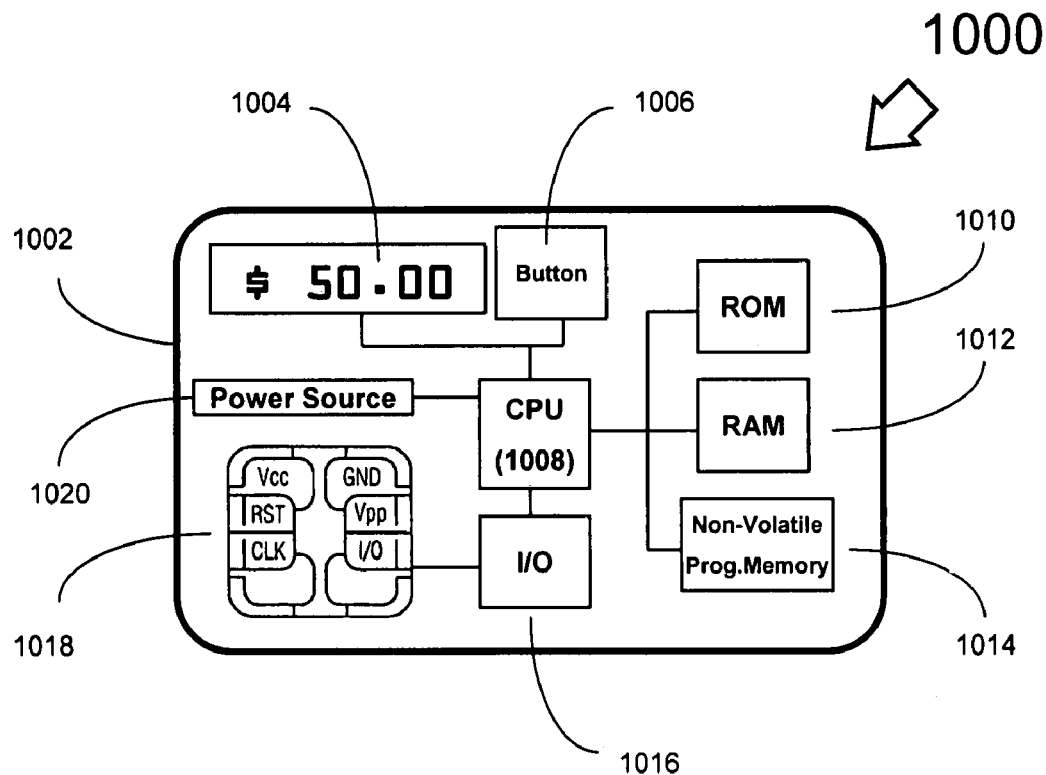

Turning to FIGS. 1A-B, these figures depict a prepayment card 1000 configured to display of a balance on a real-time balance, constructed and operative in accordance with an embodiment of the present invention. In this example, prepayment card 1000 is assumed to be a non-reloadable embodiment, but it is understood that some embodiments may be reloadable.

As shown in FIG. 1A, the payment card 1000 includes a plastic support 1002, a display 1004, and a button 1006. It is understood that plastic support 1002 may further contain a stamped imprint of a primary account number a customer name, expiration date, and various security measures such as a hologram or signature panel. Some embodiments of plastic support 1002 also have a magnetic stripe containing the personal account number and the expiration date.

Display 1004 may be a liquid crystal display (LCD), light-emitting-diode (LED), organic light-emitting-diode (OLED), surface-conduction electron-emitter display (SED), digital light processing (DLP), interferometric modulator display (IMOD) or any other display known in the art that can be used within the form factor required by the payment card 1000.

Button 1006 may be any sensor button known in the art. It is understood by those familiar in the art that one or more buttons may be implemented.

Internal components of payment card 1000 are shown in FIG. 1B. Embedded within plastic support 1002, a processor or central processing unit 1008 is electrically coupled to the display 1004, button 1006, Read-Only-Memory (ROM) 1010, Random Access Memory (RAM) 1012, a non-volatile programmable memory 1014, input/output circuitry 1016, and power supply 1020. It is understood by those familiar with the art that some or all of these elements may be embedded together in some combination as an integrated circuit (IC). Embodiments may also contain a conductive contact-making element 1018.

Processor 1008 may be any central processing unit, microprocessor, micro-controller, computational device or circuit known in the art.

Read only memory 1010 is embedded with an operating system.

Non-volatile programmable memory 1014 is configured to be an application memory device, and may store information such as the primary account number and/or current balance information. Examples of non-volatile programmable memory 1014 include, but not limited to: a magnetic stripe, flash memory, Electrically Erasable Programmable Read-Only Memory (EEPROM), or any other non-volatile computer memory or storage known in the art.

Random access memory 1012 is any temporary memory storage medium element known in the art. Random access memory is usually (but does not have to be) volatile memory.

The processor 1008, the read only memory 1010, the random access memory 1012 and the non-volatile programmable memory 1014 may coupled to one another through an internal bus system. Data can be interchanged between the input/output unit 1016, the processor 1008 and the non-volatile programmable memory 1014. Furthermore, data can be interchanged between the processor 1008 and the non-volatile programmable memory 1014.

Additionally, in some embodiments, the input/output circuitry 1016 is further coupled to a conductive contact-making element 1018 being formed in a surface area of the plastic support 1002. In some embodiments, the conductive contact-making element 1018 may be replaced by a radio frequency (RF) transceiver 1018. Radio frequency embodiments may typically use any RF transceiver known in the art for use in a radio frequency identifier (RFID) application or commonly used in a "pay wave" or "contactless" payment card.

In yet other embodiments, a contactless RF transceiver may be embedded in plastic support 1002 in addition to the conductive contact-making element 1018.

The electrically conductive contact-making element 1018 contains area elements that are electrically decoupled from one another, and these are annotated VCC, GND, RST, VPP, CLK and I/O. VCC is the connection for a supply voltage, RST is the connection for a reset signal, CLK is the connection for a clock signal, GND is the ground connection, VPP is the connection for a programming voltage, and I/O forms a connection as a data input/data output. The connection RST is used for application of a start signal for communication. A clock for the smart card processor is supplied from the outside via the connection CLK, with the clock frequency according to the described exemplary embodiment being 7.5 MHz. The programming voltage which is applied to the connection VPP is usually a voltage higher than the supply voltage. Bi-directional data transmission takes place via the input/output connection I/O for the actual interchange of useful information with the smart card. Similar data exchange or transmission takes place in contactless embodiments.

Power supply 1020 may be any electrical power supply, including a battery, fuel cell, long-term capacitor or any other power storage known in the art. Power supply 1020 may be recharged by applying a direct current voltage. A voltage is applied to the payment card 1000 as the supply voltage VCC. Example supply voltages include 5 volts, 3.3 volts, or 1.7 volts.

Figure 2A:
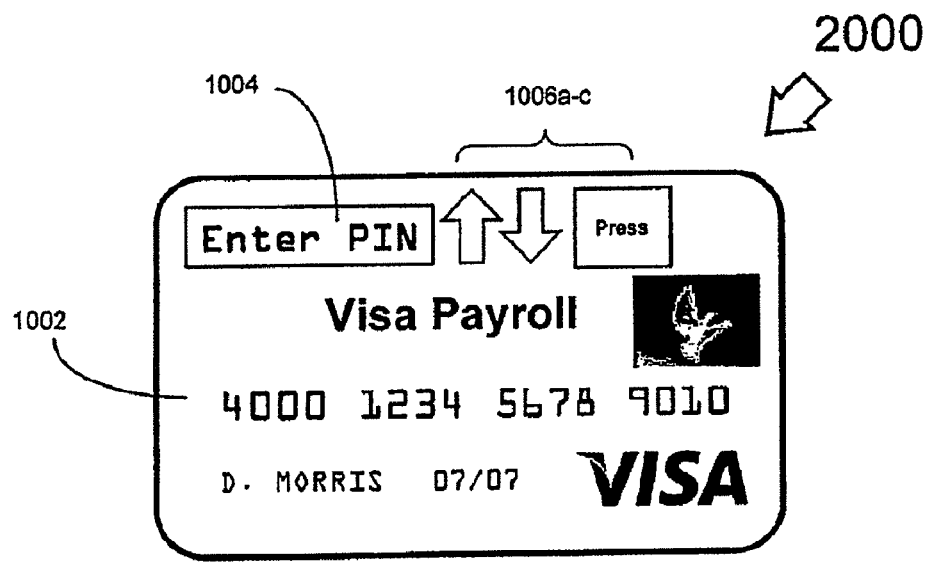
FIGS. 2A-B depict an embodiment of a reloadable prepaid payment card configured to display the current balance of the card.
Figure 2B:
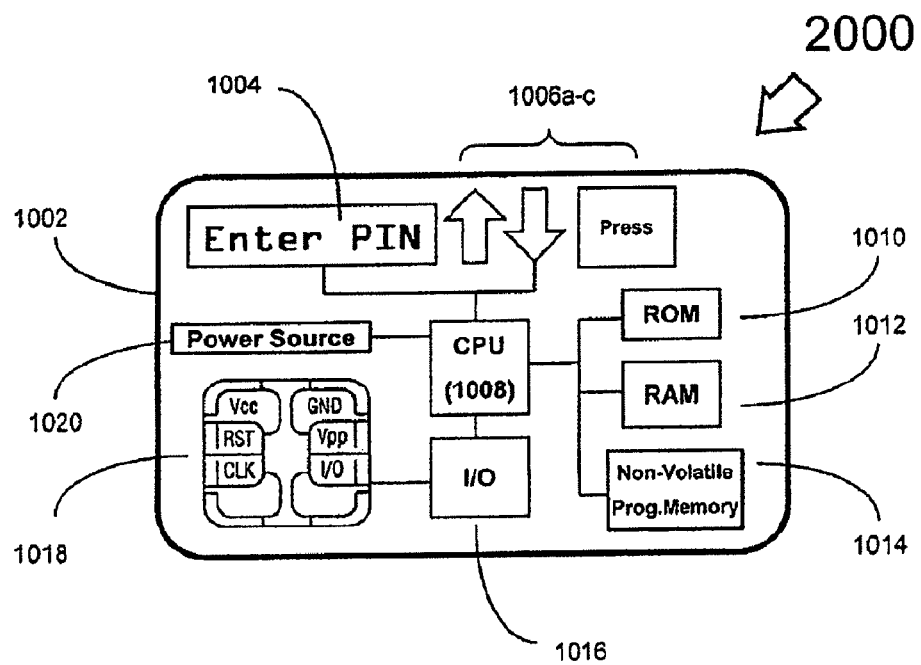

As shown in FIGS. 2A-B, constructed and operative in accordance with an embodiment of the present invention, a reloadable embodiment of a prepayment card 1000 is similar to the non-reloadable embodiment of FIGS. 1A-B, and may have multiple buttons 1006a-c. It is understood by those known in the art that any number of buttons 1006 may be implemented on a prepayment card, and that the choice of three buttons 1006 is for illustrative purposes only. Arrow buttons 1006a-b may be used for entering alpha-numeric information such as a personal identification number or alpha-numeric code. Some embodiments may implement buttons 1006 as part of a numeric pad or alpha-numeric keyboard, but available space on the card is a limitation.

Figure 3:
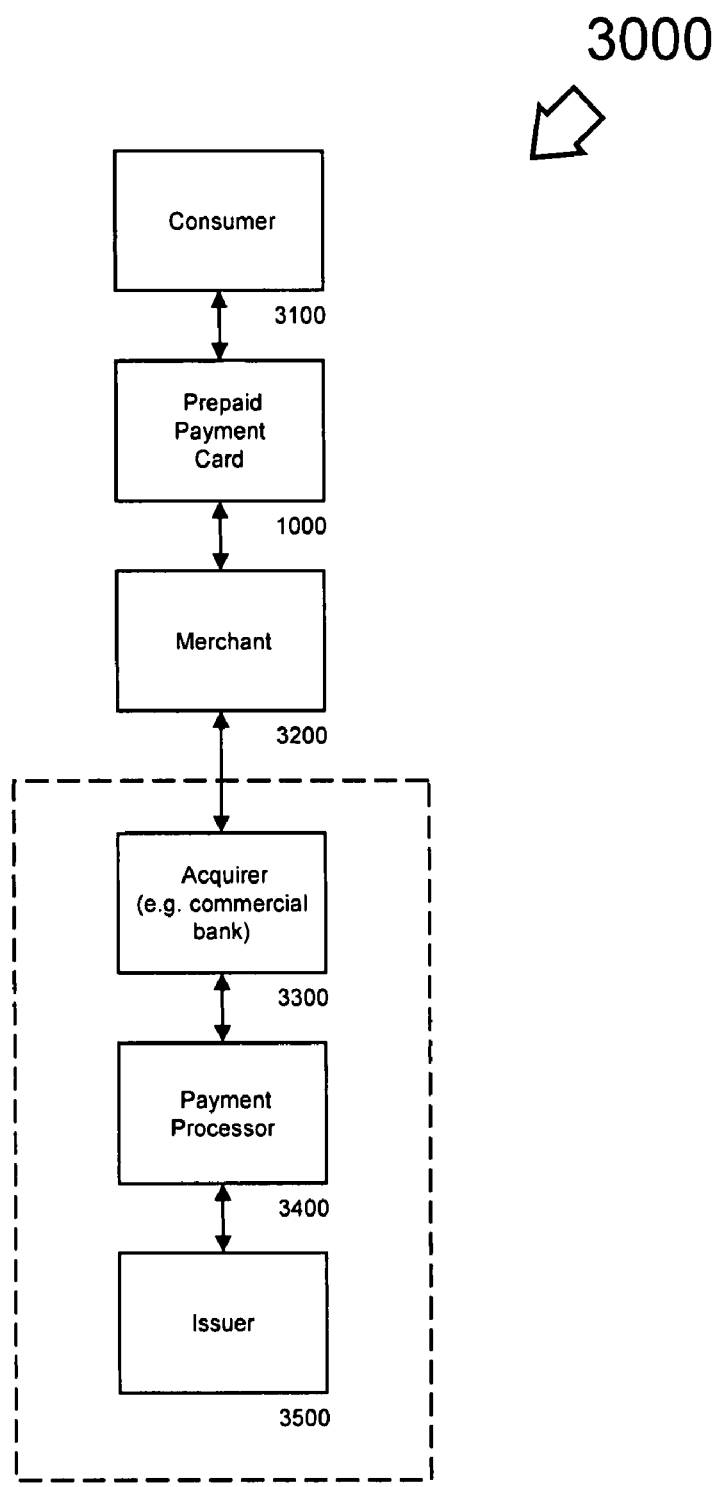
FIG. 3 is a block diagram of a system embodiment to support the display of a current balance on a prepaid payment card.

FIG. 3 illustrates a system to support the display of a real-time prepaid payment card balance, constructed and operative in accordance with an embodiment of the present invention. A customer 3100 receives a prepaid payment card 1000. In some instances the card 1000 is purchased from an issuer 3500; in other instances the customer receives the card 1000 indirectly from the issuer 3500, as a gift or as the result of a promotion. When the customer 1000 uses the prepaid payment card 1000 at a merchant 3200 to pay for a product or service, the merchant 3200 contacts an acquirer 3000 (for example, a commercial bank) to determine whether there is sufficient funds on the card to pay for the transaction or a portion of the transaction. The acquirer 3300 forwards the details of the payment transaction to a payment processor 3400 for processing. Payment processor may be any payment network known in the art. In some instances, the payment processor 3400 determines whether the transaction should be allowed; in other instances, the payment processor 3400 queries the issuer 3500 to determine whether the prepayment card has enough funds to allow the transaction.

Figure 4:
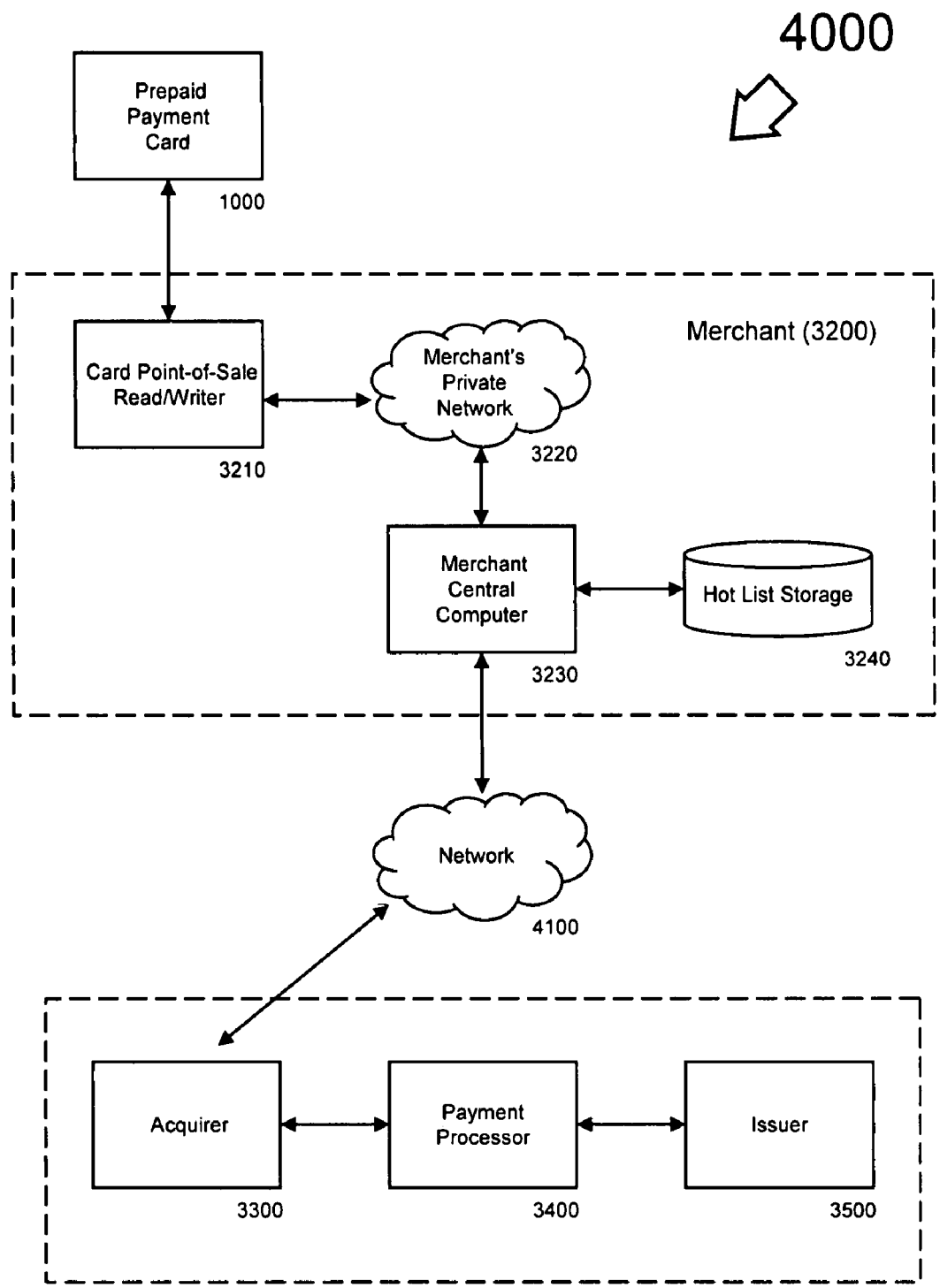
FIG. 4 is an expanded view of a merchant's system embodiment to support the display of the current balance on a prepaid payment card.

FIG. 4 depicts merchant 3200 in greater detail, where merchant 3200 includes a system to support the display of a real-time prepaid payment card balance, constructed and operative in accordance with an embodiment of the present invention. As shown, in FIG. 4, merchant 3200 comprises a card point-of-sale read/writer 3210 that communicated with a merchant central computer 3230 via the merchant's private network 3220. In some embodiments, merchant central computer 3230 may be coupled to hot list storage 3240.

Card point-of-sale read/writer 3210 is any device capable of reading a personal account number off a prepaid payment card 1000, and write card balance information to the prepaid payment card 1000.

Merchant central computer 3230 is a networked device capable of communicating transaction data with card point-of-sale read/writer 3210 and transmitting the transaction data over network 4100 to acquirer 3300.

Hot list storage 3240 may be any list, database, or memory structure containing either invalid or valid primary account numbers.

Operation of these prepayment card and system embodiments of the present invention may be illustrated by example.

We now turn our attention to method or process embodiments. It is understood by those known in the art that instructions for such method embodiments may be stored on a non-volatile programmable memory 1014 and executed by a processor 1008.

Figure 8:
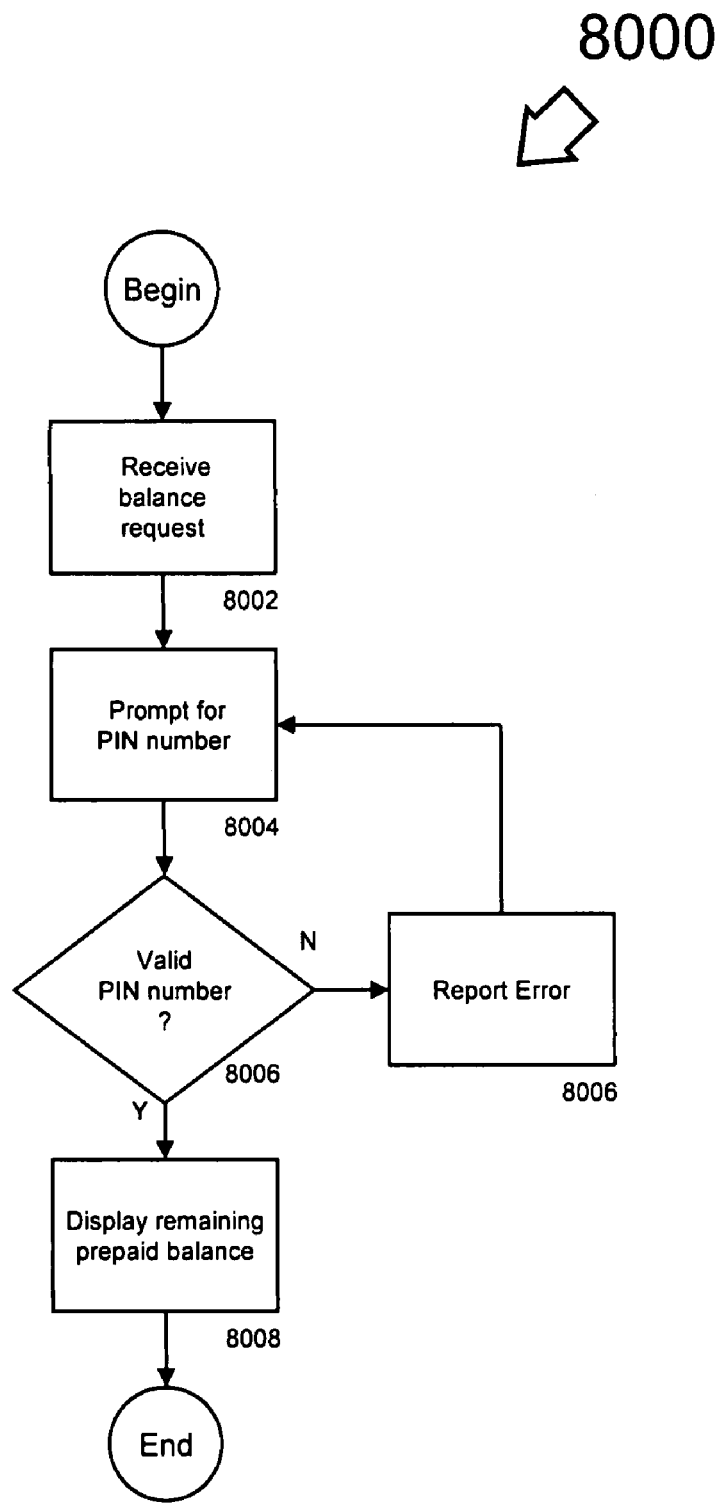
FIG. 8 illustrates a process embodiment to display the current balance of a prepaid payment card.

FIG. 8 illustrates a process embodiment to display the current balance of a prepaid payment card (1000 or 2000), constructed and operative in accordance with an embodiment of the present invention. When a user wants to know the balance of prepaid payment card (1000, 2000), the user requests the balance through pressing button 1006. The card receives the balance request, block 8002.

In card (2000) embodiments that utilize a personal identification number (PIN), display 1004 prompts the user for the PIN number, block 8004. The personal identification number may be stored in non-volatile programmable memory 1014 or in a magnetic stripe. At this point, the user may enter a PIN number using buttons 1006a-c.

In some embodiments, an error message is displayed when an invalid PIN number is entered, block 8006, and flow returns to block 8004.

Upon receipt of a valid PIN number as determined at decision block 8006, the display shows the remaining prepaid balance, block 8008.

In embodiments where a payment card 1000 does not use a PIN number, the remaining prepaid balance is displayed 8008 whenever the button 1006 is depressed.

Figure 5:
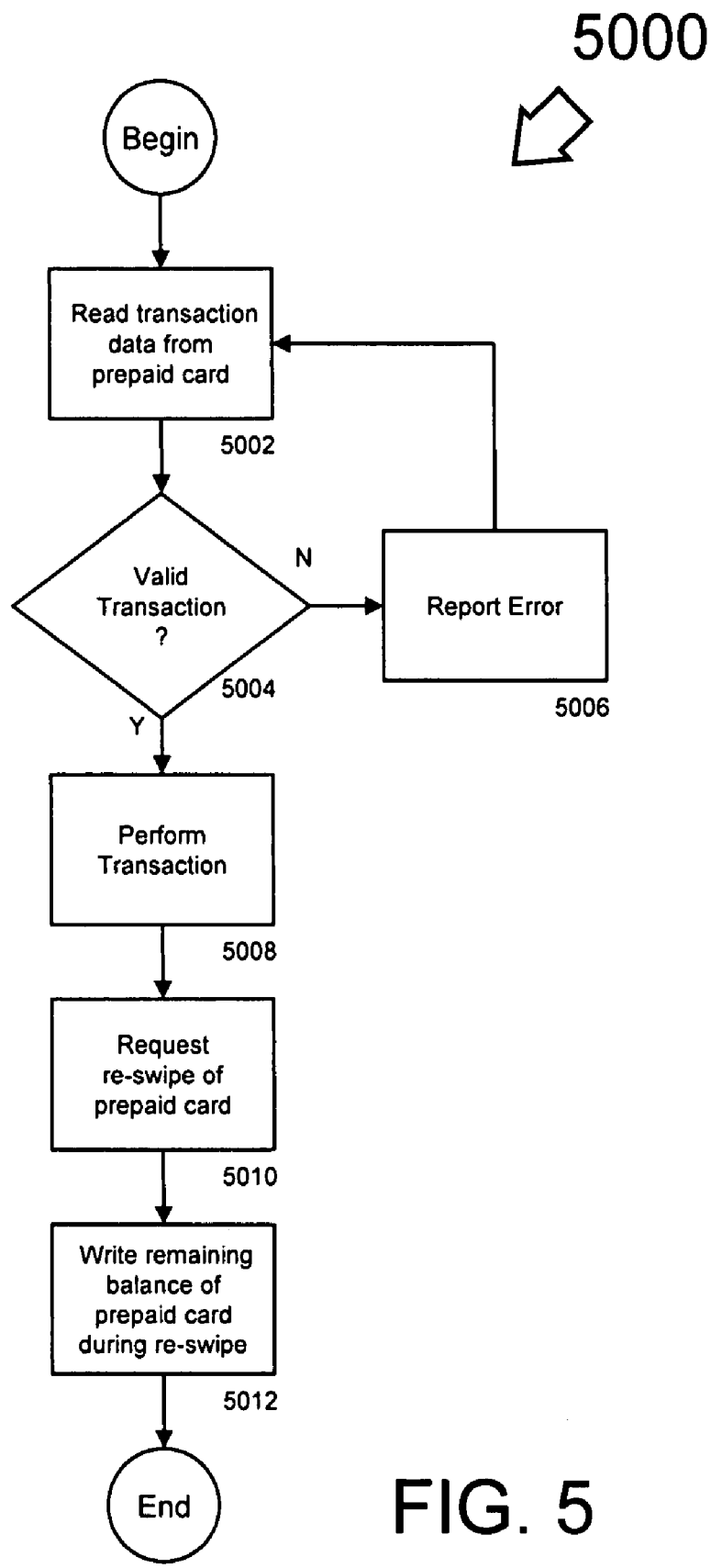
FIG. 5 is a flow chart of a card-writer process embodiment configured to store balance information on a prepaid payment card after a payment transaction.

Turning to FIG. 5 is a flow chart of a card-writer process embodiment configured to store balance information on a prepaid payment card after a payment transaction, constructed and operative in accordance with an embodiment of the present invention.

When a prepaid payment card (1000 or 2000) is presented for payment at a merchant 3200, the primary account number and other data may be read at a card point-of-sale read/writer 3210, block 5002. The card (1000 or 2000) may be presented in a variety of different methods, such as swiping the card (1000 or 2000) or via a contactless ("paywave") radio-frequency presentation, as are known in the art.

A payment card validation, as is known in the art, is performed using the data retrieved from the payment card (1000 or 2000). In some embodiments, merchant central computer 3230 consults with hot list storage 3240 to determine whether the transaction may be validated. In other embodiments, merchant central computer 3230 contacts acquirer 3300 to determine whether the transaction is valid. If the transaction is invalid as determined at decision block 5004, an error message is returned at block 5006. When the transaction is valid, flow continues at block 5008.

At block 5008, the payment transaction occurs.

At block 5010, the user is prompted to re-present the payment card (1000 or 2000). In card embodiments that use a magnetic strip, the presentation may be accomplished as a swipe of the card (1000 or 2000). During the card swipe, the remaining balance of the prepaid payment card (1000 or 2000) is written to the magnetic strip. The amount of the remaining balance may be received from issuer 3500 or payment processor 3400, or calculated by the merchant 3200 using information received from issuer 3500. In some embodiments, the card balance is written to track 3 of the magnetic strip. In other embodiments, the card balance may be written to a non-volatile programmable storage media 1014.

Figure 6:
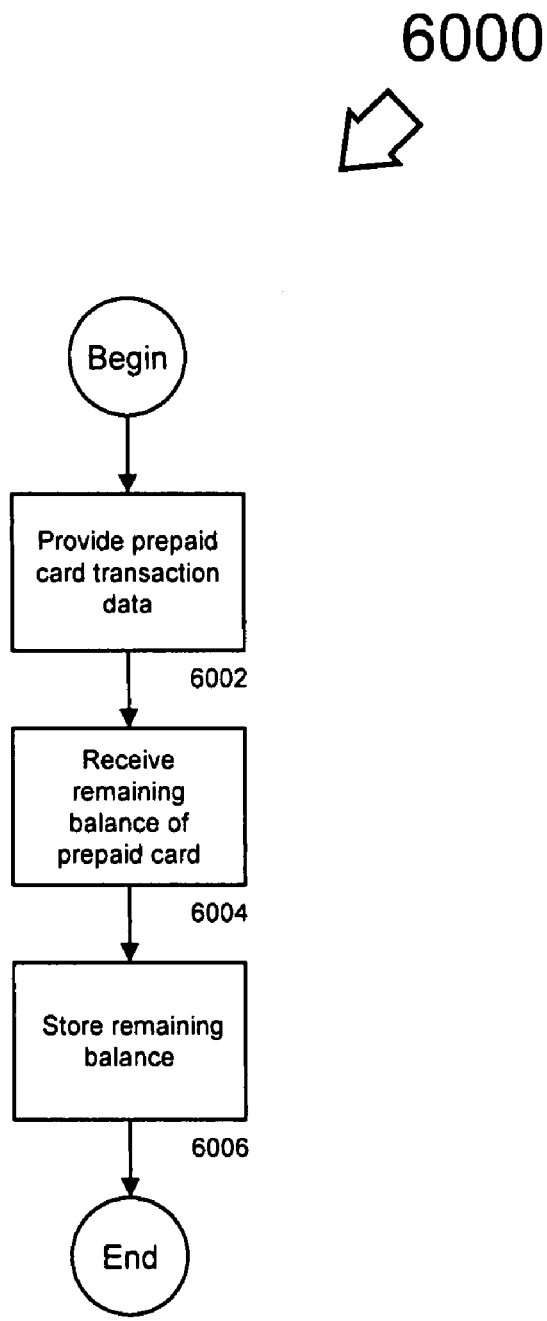
FIG. 6 illustrates a process embodiment that stores balance information on a prepaid payment card after a payment transaction.

FIG. 6 illustrates a process embodiment that stores balance information on a prepaid payment card after a payment transaction, constructed and operative in accordance with an embodiment of the present invention. As part of the payment transaction, primary account number and other information may be provided to merchant 3200, block 6002. The remaining balance of the prepaid payment card (1000 or 2000) is received from a card point-of-sale read/writer 3210, via the conductive contact-making element 1018 or an embedded radio-frequency antenna embedded within the card (1000 or 2000), at block 6004, and is written to a magnetic strip or non-volatile programmable storage memory 1014 at block 6006. In magnetic strip embodiments, the card balance may be written to track 3 or other tracks. In "smart card" embodiments, non-volatile programmable memory 1014 stores the card balance.

Figure 7:
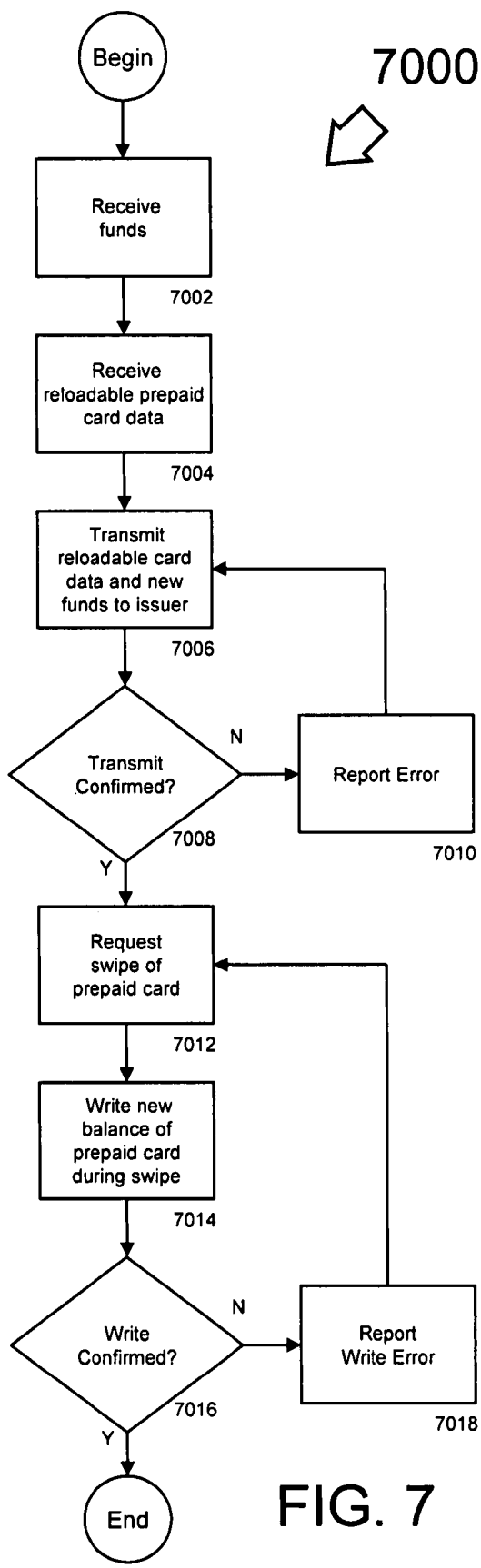
FIG. 7 is a flow chart of a card-writer process embodiment that stores balance information on a prepaid payment card after a fund reload.

At certain times, prepaid payment card 2000 users may want to add additional funds to their card 2000. In such instances, the balance of prepaid payment card 2000 needs to be updated to accurately reflect the total. FIG. 7 depicts a flow chart of a card-writer process 7000 embodiment that stores new balance information on a prepaid payment card 2000 after a fund reload, constructed and operative in accordance with an embodiment of the present invention. FIG. 7 assumes that the card reload is occurring at merchant 3200 in communication with issuer 3500; it is understood that the reload card may also occur at other locations. It is also understood that process 7000 may also be used during the activation of prepayment cards (1000, 2000) when such cards are initially purchased.

At first, merchant 3200 receives funds from consumer 3100, block 7002. The amount of the funds may vary, and may be limited by the issuer 3500. The transfer of funds may occur through a variety of different methods, including cash, or various electronic payment methods. The prepaid payment card 2000 is presented to a card point-of-sale read/writer 3210, and the primary account data 7004 is received, block 7004. The card data and new funds are transmitted to the issuer at block 7006.

If the transmission to the issuer 3500 is not confirmed, as determined by decision block 7008, an error is reported at block 7010, and flow returns to block 7006.

When the transmission to the issuer 3500 is successful, process 7000 continues at block 7012.

At block 7012, card point-of-sale read/writer 3210 requests the re-presentation of the card 2000. During the presentation, the new balance of the prepaid card is written to the card 2000. The amount of the new balance may be received as data from payment processor 3400, issuer 3500 or calculated by the merchant 3200 using information received from issuer 3500 or payment processor 3400. In card embodiments that use a magnetic strip, the presentation may be accomplished as a swipe of the card 2000. During the card swipe, the remaining balance of the prepaid payment card 2000 is written to the magnetic strip. In some embodiments, the card balance is written to track 3 of the magnetic strip. In other embodiments, the card balance may be written to a non-volatile programmable storage media 1014.

If the card balance write is not confirmed, as determined by decision block 7016, an error is reported at block 7018, and flow returns to block 7012.

When the write is successful, process 7000 ends.

The previous description of the embodiments is provided to enable any person skilled on the art to practice the invention. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

What is claimed is:

1. A method of encoding a current card balance on a prepaid payment card comprising:
   conducting a financial transaction using the prepaid payment card at a point-of-sale (POS) terminal;
   determining the current card balance after the financial transaction;
   prompting a user for presentation of the prepaid payment card at the POS terminal after the financial transaction; and
   encoding the current card balance on the prepaid payment card with the POS terminal after the financial transaction,
   wherein the prepaid payment card comprises a plastic body, a non-volatile programmable memory for encoding the current card balance, and a display configured to show the current card balance after the current balance has been encoded on the prepaid payment card,
   wherein the current card balance is determined by subtracting a transaction amount from a previous card balance.

2. The method of claim 1, wherein the current card balance is determined by querying an acquirer, payment processor, or issuer.

3. The method of claim 2, wherein the non-volatile programmable memory is a magnetic stripe on the prepaid payment card and the current card balance is encoded on the magnetic stripe.

4. The method of claim 3, wherein the current card balance is encoded on track 3 of the magnetic stripe on the prepaid payment card.

5. The method of claim 3, wherein the display is further configured to prompt the user for input of a personal identification number (PIN) and the PIN is stored on the magnetic stripe on the prepaid payment card.

6. The method of claim 1, wherein the prepaid payment card comprises a button configured to receive a request for the current card balance, wherein the display is configured to show the current card balance after the button receives the request for the current card balance.

7. The method of claim 1, wherein the display is further configured to prompt the user for input of a personal identification number (PIN).

8. The method of claim 7, wherein the prepaid payment card further comprises:
   a processor configured to determine whether the PIN is valid.

9. The method of claim 8, wherein the current card balance is displayed only if the PIN is determined to be valid.

10. The method of claim 8, wherein the prepaid payment card further comprises:
    a first button; and
    a second button, wherein the PIN is entered by the user pressing at least one of the first button or the second button.

11. The method of claim 7, wherein the PIN is stored in the non-volatile programmable memory on the prepaid payment card.

12. The method of claim 1, wherein the prepaid payment card further comprises a power supply.

13. The method of claim 1, wherein the POS terminal can read and write to payment cards.

14. The method of claim 1, wherein the user presents the prepaid payment card at the POS terminal after the financial transaction by swiping the prepaid payment card, wherein the prepaid payment card includes a magnetic strip.

15. A non-transitory computer-readable storage medium, encoded with data and instructions, such that when executed by a point-of-sale (POS) terminal, the instructions causes the POS terminal to:
    conduct a financial transaction using the prepaid payment card at the POS terminal;
    determine a current card balance of a prepaid payment card after the financial transaction;
    prompt a user for presentation of the prepaid payment card at the POS terminal after the financial transaction; and
    encode the current card balance on the prepaid payment card with the POS terminal after the financial transaction,
    wherein the prepaid payment card comprises a plastic body, a non-volatile programmable memory for encoding the current card balance, and a display configured to show the current card balance after the current balance has been encoded on the prepaid payment card,
    wherein the current card balance is determined subtracting a transaction amount from a previous card balance.

16. The non-transitory computer-readable storage medium of claim 15, wherein the current card balance is determined by querying an acquirer, payment processor, or issuer.

17. The non-transitory computer-readable storage medium of claim 16, wherein the non-volatile programmable memory is a magnetic stripe on the prepaid payment card and the current card balance is encoded on the magnetic stripe.

18. The non-transitory computer-readable storage medium of claim 17, wherein the current card balance is encoded on track 3 of the magnetic stripe on the prepaid payment card.

19. The non-transitory computer-readable storage medium of claim 15, wherein the instructions further cause the POS terminal to display the current balance on a display coupled to the POS terminal.

* * * * *